United States Patent
Garibaldi Ayarza

(10) Patent No.: US 11,751,725 B2
(45) Date of Patent: Sep. 12, 2023

(54) EXPRESS PRESS FOR FRIED, PRESSED PLANTAIN SLICES

(71) Applicant: Zobeida Garibaldi Ayarza, Corregimiento de Jose Domingo Espinar (PA)

(72) Inventor: Zobeida Garibaldi Ayarza, Corregimiento de Jose Domingo Espinar (PA)

(*) Notice: Subject to any disclaimer, the term of this patent is extended or adjusted under 35 U.S.C. 154(b) by 842 days.

(21) Appl. No.: 16/635,546

(22) PCT Filed: Sep. 7, 2017

(86) PCT No.: PCT/PA2017/000002
§ 371 (c)(1),
(2) Date: Jan. 30, 2020

(87) PCT Pub. No.: WO2019/050419
PCT Pub. Date: Mar. 14, 2019

(65) Prior Publication Data
US 2020/0383524 A1 Dec. 10, 2020

(51) Int. Cl.
*A47J 37/12* (2006.01)
*A47J 44/00* (2006.01)
*A47J 37/06* (2006.01)

(52) U.S. Cl.
CPC ....... *A47J 37/1209* (2013.01); *A47J 37/0611* (2013.01); *A47J 37/128* (2013.01); *A47J 37/129* (2013.01); *A47J 37/1219* (2013.01); *A47J 37/1295* (2013.01); *A47J 44/00* (2013.01)

(58) Field of Classification Search
CPC ................ A47J 37/1209; A47J 37/1219; A47J 37/1295; A47J 37/0611
USPC .................................. 99/403, 407, 439, 440
See application file for complete search history.

(56) References Cited

U.S. PATENT DOCUMENTS

| | | | | |
|---|---|---|---|---|
| 2,244,145 A * | 6/1941 | Erickson | ............ | A47J 27/20 126/41 R |
| 3,312,161 A * | 4/1967 | Nanna | ............ | A47J 37/0611 219/524 |
| 5,178,059 A * | 1/1993 | Eschlboeck | ............ | A47J 43/18 99/403 |
| 5,226,352 A * | 7/1993 | Savage | ............ | A23G 9/221 425/383 |
| 5,880,434 A * | 3/1999 | Pinnow | ............ | A47J 39/006 219/385 |
| 6,973,872 B2 * | 12/2005 | Morgan | ............ | A47J 43/20 99/428 |
| 8,453,563 B2 * | 6/2013 | Cohn | ............ | A23L 5/15 99/410 |
| 2002/0017198 A1 * | 2/2002 | Gauthier | ............ | A23L 5/11 99/410 |
| 2012/0285337 A1 * | 11/2012 | Webb | ............ | A21C 11/00 99/439 |

* cited by examiner

*Primary Examiner* — Reginald Alexander
(74) *Attorney, Agent, or Firm* — Noli IP Solutions, PC

(57) ABSTRACT

A versatile kitchen appliance for electrically frying and simultaneously producing a plurality of plantain pieces, while manually shaping them into flat or basket-shaped fried, by exchanging removable trays, and pressing the plantain slices placed in a frying oil container, thereby creating fried, pressed plantain slices that are flat, or otherwise basket-shaped for further stuffing with other food fillings such as meat, seafood, cold meats, fruit.

9 Claims, 3 Drawing Sheets

EXPRESS PRESS FOR FRIED, PRESSED PLANTAIN SLICES

CROSS-REFERENCES TO RELATED APPLICATIONS

The present application is a national phase application of international patent application number PCT/PA2017/000002, filed on Sep. 7, 2017.

FIELD OF THE INVENTION

The invention relates to an electric appliance for frying plantains while manually flattening slices of plantains being fried.

BACKGROUND OF THE INVENTION

Patacones, also known as tostones, are food items made from green plantains. The plantains are peeled and cut crosswise into round slices. The slices are fried in hot oil, mashed then fried in oil again. The slices can be flat of have a concave shape (or basket shape) that allows them to be filled with other food stuffing such as beans, meat, fish, cheese etc.

SUMMARY OF THE INVENTION

The invention provides an express way of making patacones. An embodiment of the invention provides an electric appliance for frying and manually crushing green plantains to produce patacones in flat or basket shapes in the same container. Through a manual lever, a user presses the plantain pieces placed inside a vessel that contains oil, to make flat or basket shaped patacones that can be filled with other foods such as meats, seafood, sausages, fruits, etc.

DETAILED DESCRIPTION

The invention provides an express way of making patacones. Throughout the disclosure, the terminology "Patacon Express/Tostonera Express" refers to a useful appliance for making patacones/tostones in the same dish. The appliance electrically fries green plantain pieces placed on the bottom base that holds the container/vessel that contains the oil, while allowing for manually crushing the plantain pieces, thus producing flat or basket-shaped patacones that can be later filled with other foods such as meats, seafood, sausages, fruits, etc.

Figure 1A:
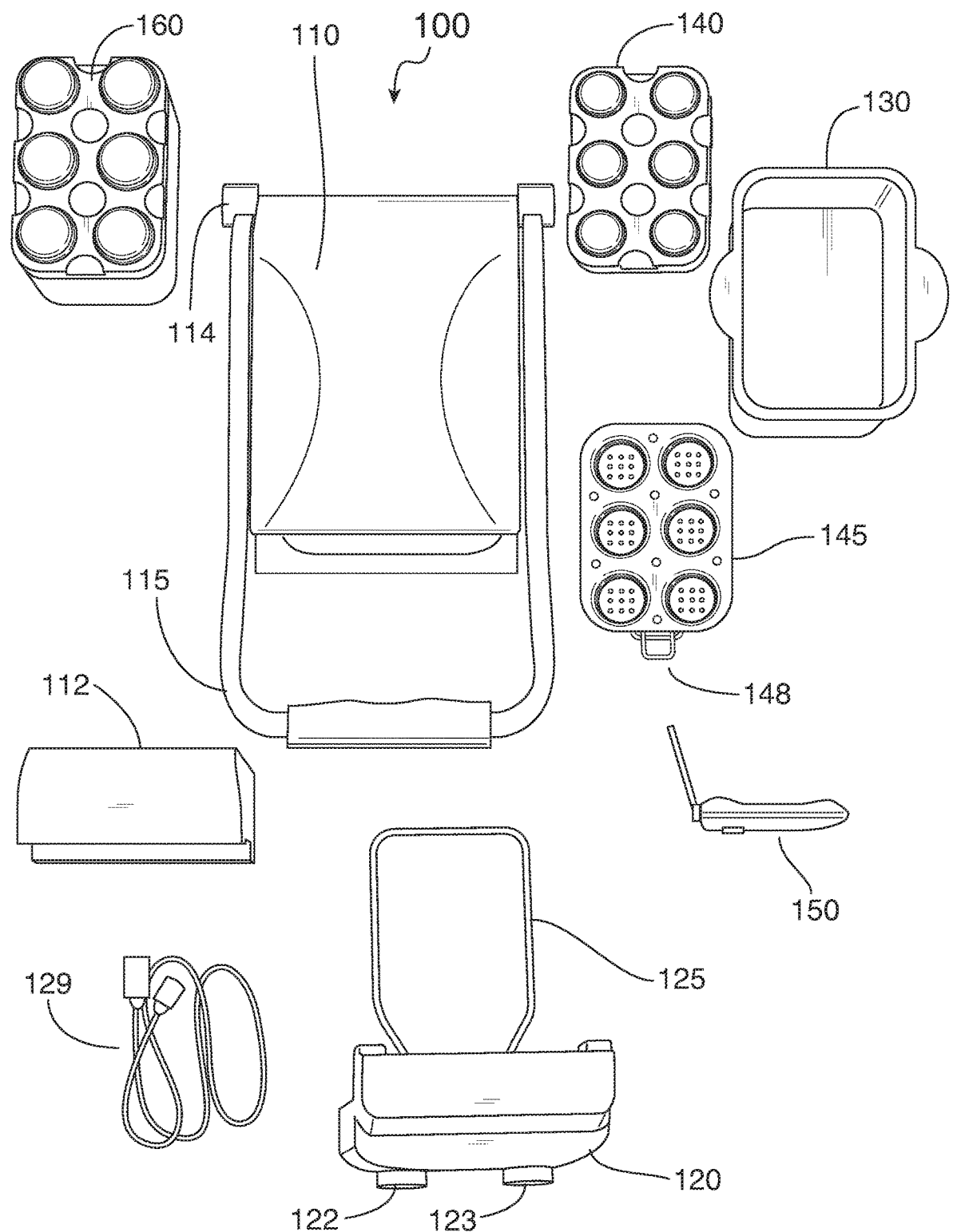
FIG. 1A represents the several parts that constitute the entirety of the appliance.
Figure 1B:
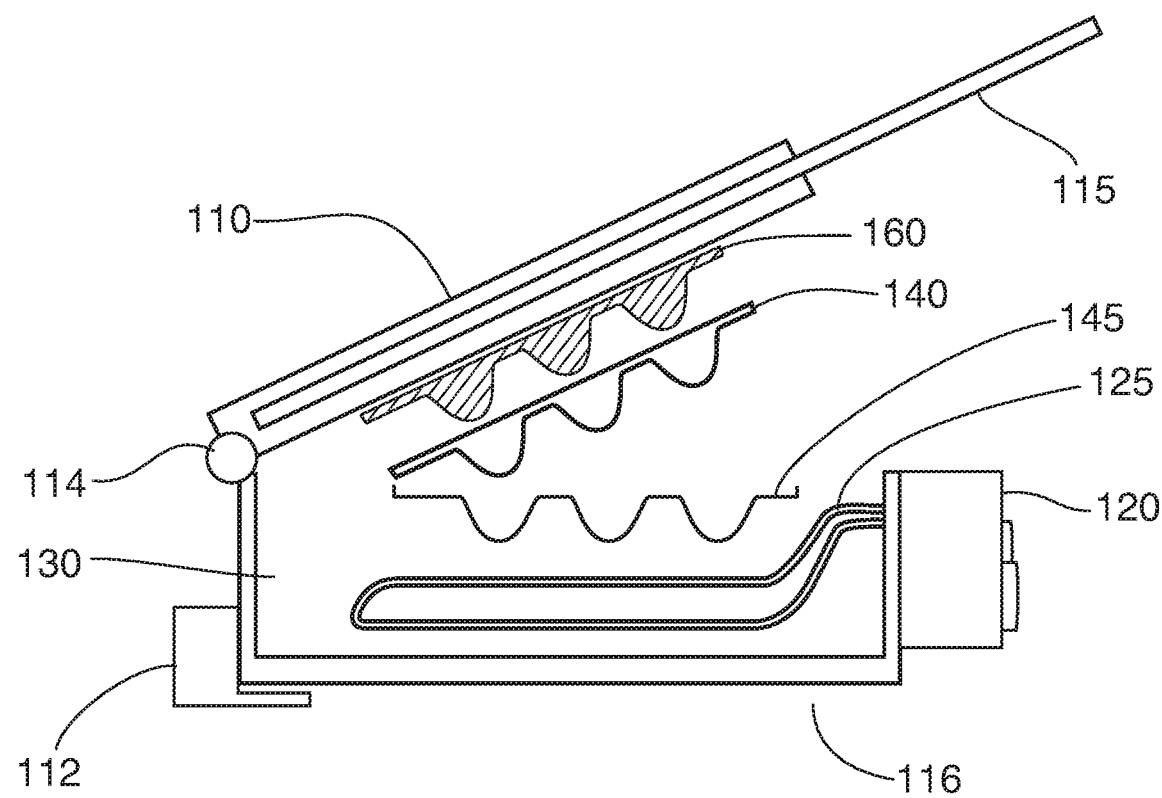
FIG. 1B represented assembled parts of the appliance.

FIG. 1A represents the several parts that, when assembled (as represented in FIG. 1B), constitute the entirety of the appliance. Patacon Express/Tostonera Express 100 consists of a plastic or metal or stainless-steel base 110 where a stainless-steel container oil tank 130 is placed, and then heated by a resistance system 125, to fry and crush the plantain creating the patacones or tostones. It consists of removable stainless-steel trays covered with Teflon or ceramic.

Patacon Express/Tostonera Express has the function of frying and crushing the plantain through a lid that has removable trays 160 with raised ovals at different scales to exert the pressure produced by the manual force on the plantain being fried in the oil.

The appliance allows for crushing several pieces of plantain at the same time, taking advantage of the malleability of the product when it is exposed to heat.

The pressure is executed by lowering the lid 115, manually. It has a control panel 120 that has two buttons 122 which the user can use to set the oil temperature, and duration of frying.

Figure 2A:
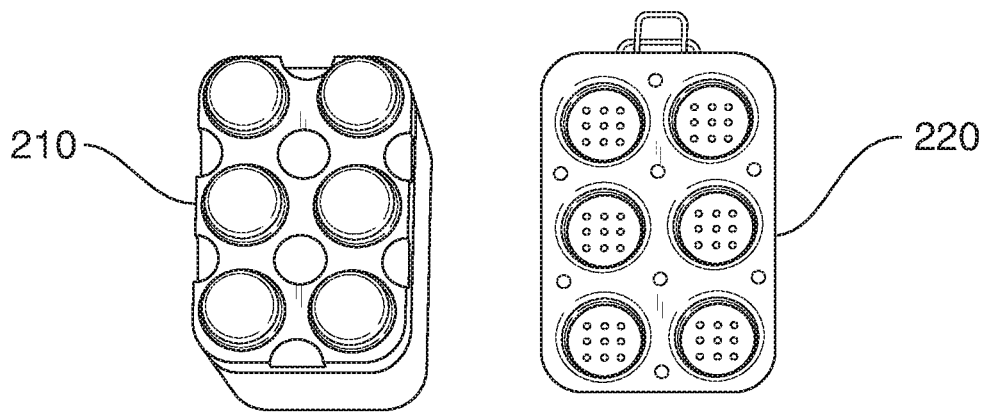
FIG. 2A represents a pair of detachable parts used for crushing plantain pieces into flat pieces.
Figure 2B:
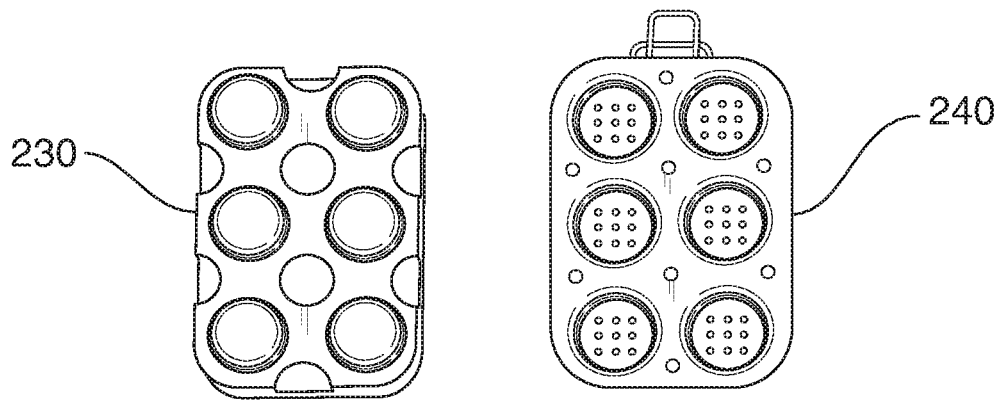
FIG. 2B represents a pair of detachable parts used for crushing plantain pieces into flat pieces.
Figure 2C:
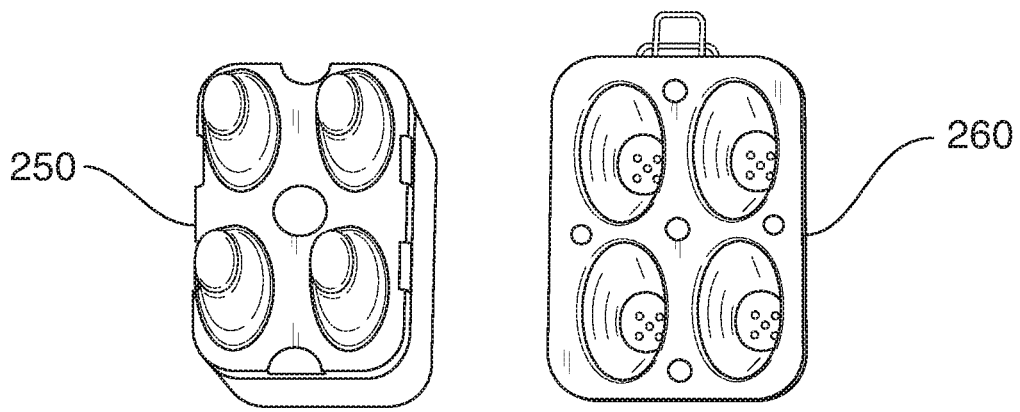
FIG. 2C represents a pair of detachable parts used for crushing plantain pieces into basket-shaped pieces.

FIGS. 2A, 2B and 2C each represent a pair of detachable parts used for crushing plantain pieces in the cooking appliance, where one part is placed in the bottom half of the cooking appliance, and receives the plantain pieces and the other part is placed above the plantain pieces.

The integral elements are the following:

1. BASE 116: Whose material is made of resistant metal (it can be made of plastic or stainless steel), it has a set of grooves on the lateral sides for the circulation and ventilation of the steam generated at the time of cooking the food.
2. HINGE 114: a mechanism for opening or closing the lid that articulates two (2) surfaces: base 116 and lid 110; It consists of two metal or plastic parts that are articulated by a common axis and are fixed on two separate surfaces, one mobile and the other fixed, and allows the rotation of one of these pieces on the other to join or separate the surfaces.
3. COVER 110: The lid is made of metal or stainless steel coated with Teflon or ceramic. It is formed to exert pressure on the plantain pieces:
    It has two (2) bottom holes for tray adjustment
    It has one (1) top hole for tray adjustment
    It has one (1) safety hook for placing the detachable trays
    A lever 115 that surrounds the cover laterally and frontally (or completely around the cover)
    Internal Tray Adjustment Frame
4. RECTANGULAR LEVER 115: It consists of a bar that rests firmly on the Lid of the appliance and is intended to increase the power of the pressure with equilibrium. It has a coupling to securely press the lever.
5. Oft CONTAINER OR VESSEL 130: The container has the ability to receive deposited oil to fry plantain/food.
    Rectangular shape
    Made from stainless steel
    Presents tabs of supports around the edges
    It has increased support tabs on the sides
6. TRAYS 140 and 145: They have holes or perforations that allow the entry and exit of oil.
    A. The appliance has two (2) top detachable trays for plantain pressure:
    a.1 A flat crushing tray 210 or 230
    a.2 A basket-crushing tray 250
        The top flat crush detachable tray 140, 210, 230 or 250:
            It is made of stainless steel (it can be made of plastic)
            It has 6 ovals of Low Scale: (the number of ovals can be increased)
            Adjustable safety hook
            It has holes that allow the transit of oil
            It is coated with nonstick
        The detachable upper basket-shaped tray 250

It is made of stainless steel (it can be made of plastic)
It has 6 ovals of Low Scale: (the number of ovals can be increased)
Adjustable safety hook
It has holes that allow the transit of oil
It is coated with nonstick B. The appliance of the invention has two (2) top detachable trays for plantain pressure:

b.1 A flat crushing tray
b.2 A basket-crushing tray

Detachable lower flat crush tray 145, 220 or 240:
It is made of stainless steel (it can be made of plastic)
6 low scale cavities account: (the number of cavities can be increased)
Handle Adjustment Hook 148
It has holes that allow the transit of the oil The detachable lower crush tray in the form of a basket 260:
It is made of stainless steel (it can be made of plastic)
4 high scale cavities account: (the number of cavities can be increased)
Handle Adjustment Hook
It has holes that allow the transit of the oil 7. TRAY ADAPTER 160: Allows a user to increase or decrease the height of the removable upper pressure trays for crush selection.

8. HANDLE 150: Its usefulness is that it is:
Adaptable
It is placed to introduce and remove the lower oil trays
It has an adjustment and/or release button.

9. REMOVABLE CONTROL PANEL 120: Consists of
1 Resistance: To heat the oil 125
1 Rotary knob to set the temperature 122
1 Rotary knob to set the cooking time 123
1 Connector (can be 3 or 2 pins or legs) 129
1 Power check button (not shown)
1 Temperature check button (not shown)

10. REMOVABLE OIL RETAINER VESSEL 112: It is placed on the back of the appliance, in the area of the base, in order to collect the dripping oil when lifting the lid after the crushing process.

Patacon Express/Tostonera Express: It has the function of manually crushing plantain that are previously peeled, cut and placed in each cavity.

It has a system of pressure aided by the lever that will make direct pressure and crushing each piece of plantain, at the same time, taking advantage of the malleability of the product when exposed to heat.

The pressure will be exerted once the plantain pieces are cooked, taking advantage of the fact that the temperature makes the product malleable.

It has a tray with cavities where the plantains are placed. It has small holes or perforations that allow the entry and exit of oil.

At the top it has a lid that will exert pressure on the main base.

The invention claimed is:

1. An apparatus for frying and crushing plantains and creating patacones or tostones in a flat or basket shapes suitable to be filled with other foods such as meats, seafood, sausages or fruits, said apparatus comprising:
a base made of a material that comprises any of plastic, metal or stainless steel;
an oil container preferably made of stainless steel, placed within said base;
a resistance system for electrically heating said oil container;
a bottom removable tray made of metal and covered with Teflon or ceramic for receiving a plurality of pieces of plantain;
a top removable tray for exerting pressure and shaping said plurality of pieces of plantain;
a lid and a rectangular lever in the form of a raised bar in a front part that is fixedly supported on the lid; and
a removable oil retainer vessel placed on a back part of the apparatus, in an area of the base, in order to collect the dripping oil when lifting the lid after the crushing process.

2. The apparatus of claim 1, wherein said lever is configured to increase the power of manual pressure.

3. The apparatus of claim 2, wherein said top removable tray is attached to said lid.

4. The apparatus of claim 3, wherein said top removable tray further having a plurality of raised ovals at different scales configured for simultaneously exerting pressure on said plurality of pieces of plantain when said lid is manually moved to where said top removable tray reaches said bottom removable tray within said oil container.

5. The apparatus of claim 4, wherein said plurality of raised ovals is four (4) of said raised ovals.

6. The apparatus of claim 4, wherein said plurality of raised ovals is six (6) of said raised ovals.

7. The apparatus of claim 1, wherein said top removable tray and said bottom removable tray are used for flattening said plurality of pieces of plantains.

8. The apparatus of claim 1, wherein said top removable tray and said bottom removable tray are basket-shaped trays for so shaping said plurality of pieces of plantains.

9. The apparatus of claim 1, further comprises a tray adapter.

* * * * *